(12) United States Patent
Cho et al.

(10) Patent No.: US 10,873,108 B2
(45) Date of Patent: Dec. 22, 2020

(54) LITHIUM BATTERY

(71) Applicant: SAMSUNG SDI CO., LTD., Yongin-si (KR)

(72) Inventors: Inhaeng Cho, Yongin-si (KR); Hyejin Park, Yongin-si (KR); Seonghun Jeong, Yongin-si (KR); Sanghoon Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 74 days.

(21) Appl. No.: 16/300,134

(22) PCT Filed: Jun. 8, 2017

(86) PCT No.: PCT/KR2017/005971
§ 371 (c)(1),
(2) Date: Nov. 9, 2018

(87) PCT Pub. No.: WO2017/213441
PCT Pub. Date: Dec. 14, 2017

(65) Prior Publication Data
US 2019/0148776 A1    May 16, 2019

(30) Foreign Application Priority Data
Jun. 9, 2016   (KR) ...................... 10-2016-0071735

(51) Int. Cl.
*H01M 10/0569* (2010.01)
*H01M 10/0567* (2010.01)
(Continued)

(52) U.S. Cl.
CPC ..... *H01M 10/0569* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS 8,623,558 B2   1/2014  Deguchi
9,123,973 B2   9/2015  Lee et al.
(Continued)

FOREIGN PATENT DOCUMENTS

KR   10-2008-0054100 A   6/2008
KR   10-2012-0036882 A   4/2012
(Continued)

OTHER PUBLICATIONS

International Search Report for PCT/KR2017/005971.

*Primary Examiner* — Sarah A. Slifka
(74) *Attorney, Agent, or Firm* — Lee IP Law, P.C.

(57) ABSTRACT

A lithium battery includes: a cathode having a mixture density of 3.9 g/cc or greater; an anode; and an electrolyte including a non-aqueous organic solvent disposed between the cathode and the anode, wherein the lithium battery has an operating voltage of 4.4 V or greater, and the non-aqueous organic solvent includes at least one first non-aqueous organic solvent selected from ethyl butyrate and methyl valerate, and the first non-aqueous organic solvent is contained in an amount of 20 to 50 volume % with based on a total volume of the non-aqueous organic solvent.

20 Claims, 10 Drawing Sheets

(51) Int. Cl.
  *H01M 10/0525* (2010.01)
  *H01M 10/0568* (2010.01)
  *H01M 10/052* (2010.01)
  *H01M 4/02* (2006.01)

(52) U.S. Cl.
  CPC ... *H01M 10/0567* (2013.01); *H01M 10/0568* (2013.01); *H01M 2004/021* (2013.01); *H01M 2300/0037* (2013.01)

(56) References Cited

U.S. PATENT DOCUMENTS

| | | |
|---|---|---|
| 9,472,813 B2 | 10/2016 | Uzun et al. |
| 9,806,379 B2 | 10/2017 | Lim et al. |
| 2008/0138713 A1 | 6/2008 | Roh et al. |
| 2009/0253046 A1 | 10/2009 | Smart et al. |
| 2012/0107700 A1 | 5/2012 | Deguchi |
| 2012/0164519 A1 | 6/2012 | Lee et al. |
| 2015/0349381 A1 | 12/2015 | Hwang et al. |

FOREIGN PATENT DOCUMENTS

| | | |
|---|---|---|
| KR | 10-2012-0090755 A | 8/2012 |
| KR | 10-2013-0130775 A | 12/2013 |
| KR | 10-2014-0139442 A | 12/2014 |
| KR | 10 2015-0138813 A | 12/2015 |
| KR | 10-2015-0138813 A | 12/2015 |

LITHIUM BATTERY

CROSS REFERENCE TO RELATED APPLICATIONS

This is the U.S. national phase application based on PCT Application No. PCT/KR2017/005971, filed Jun. 8, 2017, which is based on Korean Patent Application No. 10-2016-0071735, filed Jun. 9, 2016, the entire contents of all of which are hereby incorporated by reference.

TECHNICAL FIELD

The present disclosure relates to a lithium battery.

BACKGROUND ART

Lithium batteries are used in portable electronic devices such as video cameras, mobile phones, or notebook computers as driving power sources. Among them, rechargeable lithium secondary batteries have higher energy density per unit weight by three times or more and are charged at higher speeds than lead-acid batteries, nickel-cadmium batteries, nickel-hydrogen batteries, or nickel-zinc batteries.

Charge potentials of these lithium secondary batteries may be increased for high capacity. Under such a high voltage, an electrolyte may easily be oxidatively decomposed in a cathode of a lithium secondary battery. Due to oxidative decomposition of an electrolyte, decomposition products of the electrolyte may be deposited on the surface of the cathode of the lithium secondary battery and it may be difficult to maintain a high voltage.

Thus, there is still a need for a lithium battery having improved lifespan characteristics at room temperature and at a high temperature and decreased thickness variations by inhibiting deterioration of a cathode under a high voltage.

DESCRIPTION OF EMBODIMENTS

Technical Problem

Provided is a lithium battery having improved lifespan characteristics and a decreased thickness variation rate of a cathode at room temperature and a high temperature under a high voltage.

Solution to Problem

According to an aspect of the present disclosure, provided is a lithium battery including:

a cathode having a mixture density of 3.9 g/cc or greater;

an anode; and an electrolyte disposed between the cathode and the anode and including a non-aqueous organic solvent, wherein the lithium battery has an operating voltage of 4.4 V or greater, the non-aqueous organic solvent includes at least one first non-aqueous organic solvent selected from ethyl butyrate and methyl valerate, and an amount of the first non-aqueous organic solvent is from 20 to 50 vol % based on a total volume of the non-aqueous organic solvent.

Advantageous Effects of Disclosure

According to an embodiment, since a high voltage lithium battery including a cathode with a mixture density of 3.9 g/cc or greater and having an operating voltage of 4.4 V or greater includes an electrolyte including at least one first non-aqueous organic solvent selected from ethyl butyrate and methyl valerate and the amount of the first non-aqueous organic solvent is from 20 to 50 vol % based on a total volume of a non-aqueous organic solvent, lifespan characteristics may be improved and thickness variation rates may be decreased at room temperature and a high temperature under a high voltage.

BEST MODE

Figure 1:
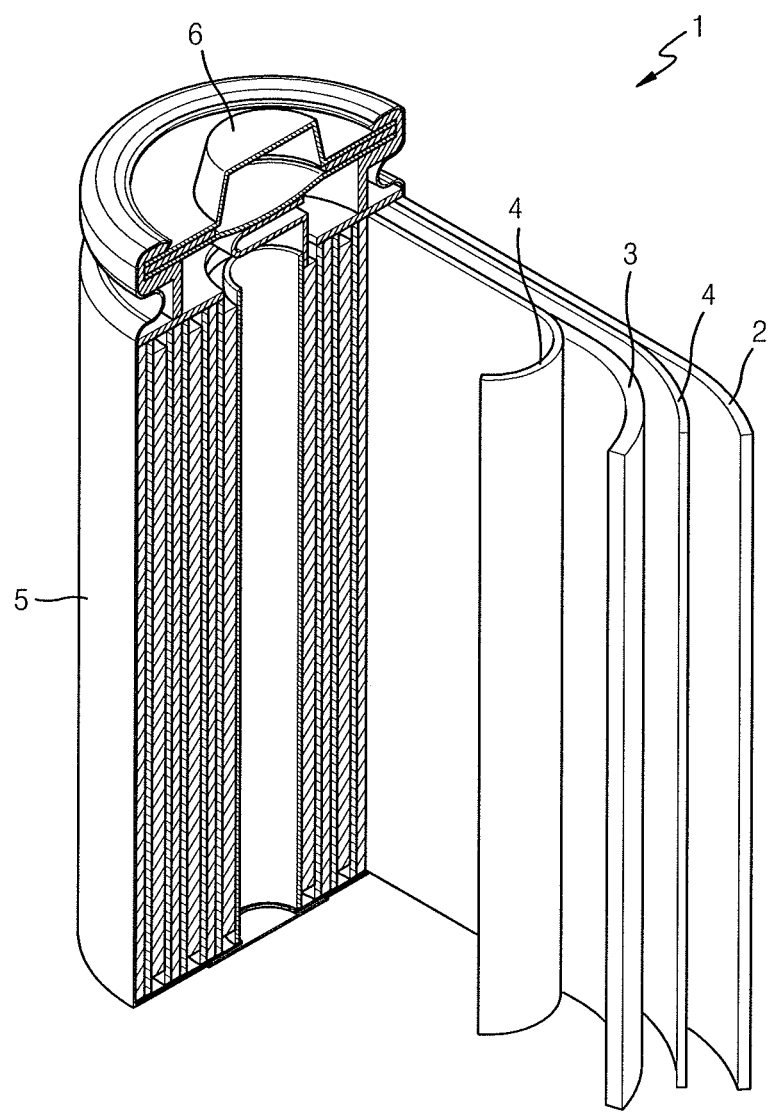
FIG. 1 is a schematic diagram of a lithium secondary battery according to an embodiment.

Hereinafter, lithium batteries according to exemplary embodiments will be described in more detail.

A lithium battery includes a cathode and an anode allowing intercalation and deintercalation of lithium ions in a non-aqueous electrolyte. For example, $LiCoO_2$ or the like may be used as a cathode active material of the cathode, and carbon black or the like may be used as an anode active material of the anode. For example, an electrolyte may include a lithium salt such as $LiPF_6$ dissolved in a carbonate-based non-aqueous organic solvent.

$LiPF_6$ or the like in the electrolyte may be generated using PCI, or the like, but anions such as Cl ions may remain in the electrolyte as an acid contaminant. A cathode material such as Co in the cathode is easily eluted since the cathode active material is likely to bind to the acid contaminant of the anions such as Cl ions remaining in the electrolyte. Thus, the capacity of the lithium battery may decrease due to corrosion of a surface of the cathode and/or a short circuit may occur since a transition metal such as eluted Co arrives at the anode.

Furthermore, the transition metal such as Co is more easily eluted since the stability of the cathode active material deteriorates under a high voltage. Thus, the capacity of lithium battery may decrease and it may be difficult to increase capacity due to swelling of cells or considerable increase in occurrence of short circuits.

A lithium battery according to an embodiment includes: a cathode having a mixture density of 3.9 g/cc or greater; an anode; and an electrolyte disposed between the cathode and the anode and including a non-aqueous organic solvent, wherein the lithium battery has an operating voltage of 4.4 V, the non-aqueous organic solvent includes at least one first non-aqueous organic solvent selected from ethyl butyrate and methyl valerate, and an amount of the first non-aqueous organic solvent is from 20 to 50 vol % based on a total volume of the non-aqueous organic solvent.

The lithium battery according to an embodiment may include a cathode having a mixture density of 3.9 g/cc or greater, an anode, and an electrolyte disposed between the cathode and the anode and including a non-aqueous organic solvent. For example, the lithium battery may include a cathode having a mixture density of 3.9 to 4.3 g/cc. For example, the lithium battery may have an operating voltage of 4.4 to 4.5 V.

The lithium battery may realize high capacity by including a cathode having the above-described high mixture density. The lithium battery may have a high operating voltage within the above-described range.

In such lithium batteries having a high mixture density and a high operating voltage, an ester-based non-aqueous organic solvent having a low viscosity may be used as the electrolyte.

The lithium battery according to an embodiment may include at least one first non-aqueous organic solvent selected from ethyl butyrate and methyl valerate, and the amount of the first non-aqueous organic solvent may be from 20 to 50 vol % based on the total volume of the non-aqueous organic solvent.

Since the first non-aqueous organic solvent has a lower oxidation initiation voltage than a propyl propionate non-aqueous organic solvent in the electrolyte by about 0.5 V (vs. Li/Li$^+$) or more, oxidative decomposition of a lithium salt and/or an additive occurs at a lower voltage in electrolyte, and thus a stronger film may be formed on the cathode. Thus, the first non-aqueous organic solvent is more electrochemically stable in the electrolyte than the propyl propionate non-aqueous organic solvent. In addition, when the amount of the first non-aqueous organic solvent is within the range described above, a lithium battery including the same may have improved lifespan characteristics at room temperature and a high temperature, and thickness variation of the cathode may be reduced.

The non-aqueous organic solvent may include at least one second non-aqueous organic solvent selected from ethylene carbonate, propylene carbonate, diethyl carbonate, and ethyl propionate.

An amount of the ethylene carbonate may be from 20 to 30 vol %, for example, from 20 to 25 vol %, based on the total volume of the non-aqueous organic solvent. An amount of the propylene carbonate may be from 0 to 10 vol %, for example, from 0 to 5 vol %, based on the total volume of the non-aqueous organic solvent. An amount of the ethyl propionate may be from 20 to 50 vol %, for example 20 to 40 vol %, for example from 20 to 30 vol %, based on the total volume of the non-aqueous organic solvent.

When the amount of the second non-aqueous organic solvent is within the ranges described above, oxidative decomposition may be suppressed in the electrolyte, and thus, excessive formation of the film on the cathode may be suppressed. The lithium battery further including the second non-aqueous organic solvent may have improved lifespan characteristics at room temperature and a high temperature.

The electrolyte may further include at least one first additive selected from fluoroethylene carbonate, vinylethylene carbonate, 1,3-propane sultone, succinonitrile, and LiBF$_4$.

Fluoroethylene carbonate, vinylethylene carbonate, and 1,3-propane sultone may improve the capacity retention ratio of the lithium battery at a high temperature by improving the thermal stability of the lithium battery. When used as an electrolyte additive in the lithium battery including a cathode having a high mixture density, succinonitrile may improve lifespan characteristics at room temperature, thereby providing a high capacity lithium battery.

An amount of the at least one first additive may be from 0.5 to 20 wt % based on a total weight of the electrolyte. When the electrolyte includes the first additive within the above range, a stronger film may be formed on the surface of the cathode under a high voltage, thereby further increasing discharge capacity and capacity retention ratio at a high temperature as well as room temperature.

The electrolyte may further include a second additive represented by Formula 1 below.

[Formula 1]

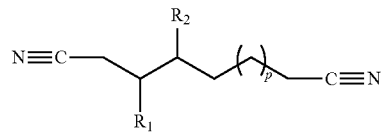

In Formula 1, p may be an integer from 0 to 10;

$R_1$ and $R_2$ may each independently be a hydrogen atom, a cyano group, a substituted or unsubstituted C1-C5 alkylene cyano group, or any combination thereof, wherein at least one of $R_1$ and $R_2$ may be a cyano group or a substituted or unsubstituted C1-C5 alkylene cyano group.

The term "alkylene cyano group" used in Formula 1 above refers to a cyano group connected to a completely saturated branched or unbranched (or straight or linear) hydrocarbon group.

Examples of the "alkylene cyano group" may include, but are not limited to, a methylene cyano group, an ethylene cyano group, an n-propylene cyano group, an isopropylene cyano group, an n-butylene cyano group, an isobutylene cyano group, a sec-butylene cyano group, or an n-pentylene cyano group.

At least one hydrogen atom of the "alkylene cyano group" may be substituted with a halogen atom, a C1-C20 alkyl group substituted with a halogen atom (e.g.: CCF$_3$, CHCF$_2$, CH$_2$F, and CCl$_3$), a C1-C20 alkyoxy group, a C2-C20 alkoxyalkyl group, a hydroxyl group, a nitro group, a cyano group, an amino group, a C1-C20 alkyl group, a C2-C20 alkenyl group, a C2-C20 alkynyl group, a C1-C20 heteroalkyl group, a C6-C20 aryl group, a C6-C20 arylakyl group, a C6-C20 heteroaryl group, a C7-C20 heteroarylakyl group, a C6-C20 heteroaryloxy group, or a C6-C20 heteroaryloxyalkyl group.

For example, the second additive may include 1,3,6-hexanetricarbonitrile, 1,2,6-hexanetricarbonitrile, or any combination thereof.

The second additive that is a hydrocarbon compound including three cyano groups (CN groups) may improve the stability of the lithium battery by reducing a degree of thickness variation of the lithium battery at a high temperature.

The reason why the stability of the lithium battery is improved by reducing the degree of thickness variation of the lithium battery at a high temperature will be described in more detail below in terms of electrochemical properties. However, the descriptions are only for enhancement of understanding of the present disclosure and the scope of the present disclosure is not limited thereto.

It may be considered that N unshared pairs of electrons at a terminal of a cyano group (CN group) of the second additive is coordinated with various types of metals such as a transition metal of the cathode active material, and thus a film may stably be formed on the surface of the cathode and side reactions between the cathode and the electrolyte may be inhibited thereby. Also, it may be considered that the second additive inhibits a temperature increase of the lithium battery by preventing a heat generation phenomenon after decomposition of other constituent substances since the second additive binds to the constituent substances of the lithium battery. It may also be considered that the second additive inhibits short circuits occurring due to precipitation of contaminants of metal ions on the surface of the anode since the second additive binds to various metal ions within the lithium battery.

An amount of the second additive may be from 0.5 to 5 wt %, for example 0.5 to 4 wt %, for example 0.5 to 3 wt %, or for example 0.5 to 2 wt %, based on the total weight of the electrolyte.

When the amount of the second additive is within the ranges above, the cathode active material stably binds to the second additive on the surface thereof, and thus the degree of thickness variation may be reduced at a high temperature, thereby further improving the stability of the lithium battery.

The cathode may include a film formed on the surface thereof, and the film may be a product derived from the first additive, the second additive, or a part or all of the first additive and the second additive.

The electrolyte may further include at least one lithium salt selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, and lithium chloroborate. However, the lithium salt is not limited thereto and any substance well known in the art as a lithium salt may also be used. An amount of the lithium salt may be from 0.1 to 5 wt % based on the total weight of the electrolyte.

A concentration of the lithium salt may be from 0.01 to 2.0 M, for example 0.05 to 2.0 M, for example 0.1 to 2.0 M, for example 0.5 to 2.0 M. However, the concentration is not limited thereto and any appropriate concentration may also be used if required. Within the concentration ranges, further improved battery characteristics may be obtained.

In the lithium battery according to an embodiment, the electrolyte may include: a first non-aqueous organic solvent of ethyl butyrate or methyl valerate; a second non-aqueous organic solvent including ethylene carbonate, propylene carbonate, and ethyl propionate; a first additive including fluoroethylene carbonate, vinylethylene carbonate, 1,3-propane sultone, succinonitrile, and LiBF$_4$; and a lithium salt.

A weight ratio of fluoroethylene carbonate, vinylethylene carbonate, 1,3-propane sultone, succinonitrile, and LiBF$_4$ included in the first additive may be 4.0 to 10.0:0.1 to 5.0:0.1 to 5.0:0.1 to 7.0:0.01 to 1.0.

The lithium battery including the electrolyte may have improved lifespan characteristics at a high voltage at room temperature and a high temperature and reduced swelling of cells after cycles are terminated. In addition, the cathode may have reduced thickness variation after being maintained at a high temperature.

In the lithium battery according to an embodiment, the electrolyte may include a first non-aqueous organic solvent of ethyl butyrate or methyl valerate; a second non-aqueous organic solvent including ethylene carbonate, propylene carbonate, and ethyl propionate; a first additive including fluoroethylene carbonate, vinylethylene carbonate, and 1,3-propane sultone; a second additive including 1,3,6-hexanetricarbonitrile or 1,2,6-hexanetricarbonitrile; and a lithium salt.

A weight ratio of fluoroethylene carbonate, vinylethylene carbonate, and 1,3-propane sultone included in the first additive may be 4.0 to 10.0:0.1 to 5.0:0.1 to 5.0.

The amount of the second additive may be from 0.5 to 2 wt % based on the total weight of the electrolyte.

The lithium battery including the electrolyte may have improved lifespan characteristics at a high temperature under a high voltage.

Meanwhile, the shape of the lithium battery is not particularly limited and the lithium battery may include lithium primary batteries as wells as lithium secondary batteries such as lithium-ion batteries, lithium-ion polymer batteries, and lithium-sulfur batteries.

For example, the lithium battery may be manufactured according to the following method.

First, a cathode is prepared.

For example, a cathode active material composition in which a cathode active material, a conductive material, a binder, and a solvent are mixed is prepared. The cathode active material composition is directly coated on a metal current collector to prepare a cathode plate. Alternatively, the cathode active material composition may be cast on a separate support, and then a film separated from the support is laminated on a metal current collector to prepare a cathode plate. The cathode is not limited to the shapes described above and may have any other shapes.

The cathode active material may include any lithium-containing metal oxide commonly used in the art without limitation. For example, at least one composite oxide of lithium and a metal selected from cobalt, manganese, nickel, and any combination thereof, particularly a compound represented by any one of the following formulae: Li$_a$A$_{1-b}$B'$_b$D'$_2$ (where 0.90≤a≤1.8 and 0≤b≤0.5); Li$_a$E$_{1-b}$B'$_b$O$_{2-c}$D'$_c$ (where 0.90≤a≤1.8, 0≤b≤0.5, and 0≤c≤0.05); LiE$_{2-b}$B'$_b$O$_{4-c}$D'$_c$ (where 0≤b≤0.5 and 0≤c≤0.05); Li$_a$Ni$_{1-b-c}$Co$_b$B'$_c$D'$_\alpha$ (where 0.90≤a≤1.8, 0≤b≤0.5, 0≤c≤0.05, and 0<α≤2); Li$_a$Ni$_{1-b-c}$Co$_b$B'$_c$O$_{2-\alpha}$F'$_\alpha$ (where 0.90≤a≤1.8, 0≤b≤0.5, 0≤c≤0.05, and 0<α<2); Li$_a$Ni$_{1-b-c}$Co$_b$B'$_c$O$_{2-\alpha}$F'$_2$ (where 0.90≤a≤1.8, 0≤b≤0.5, 0≤c≤0.05, and 0<α<2); Li$_a$Ni$_{1-b-c}$Mn$_b$B'$_c$D'$_\alpha$, (where 0.90≤a≤1.8, 0≤b≤0.5, 0≤c≤0.05, and 0<α≤2); Li$_a$Ni$_{1-b-c}$Mn$_b$B'$_c$O$_{2-\alpha}$F'$_\alpha$ (where 0.90≤a≤1.8, 0≤b≤0.5, 0≤c≤0.05, and 0<α<2); Li$_a$Ni$_{1-b-c}$Mn$_b$B'$_c$O$_{2-\alpha}$F'$_2$ (where 0.90≤a≤1.8, 0≤b≤0.5, 0≤c≤0.05, and 0<α<2); Li$_a$N-i$_b$E$_c$G$_d$O$_2$ (where 0.90≤a≤1.8, 0≤b≤0.9, 0≤c≤0.5, 0.001≤d≤0.1); Li$_a$Ni$_b$Co$_c$Mn$_d$G$_e$O$_2$ (where 0.90≤a≤1.8, 0≤b≤0.9, 0≤c≤0.5, 0≤d≤0.5, and 0.001≤e≤0.1); Li$_a$NiG$_b$O$_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In the formulae, above, A is Ni, Co, Mn, or any combination thereof; B' is Al, Ni, Co, Mn, Cr, Fe, Mg, Sr, V, a rare earth element, or any combination thereof; D' is O, F, S, P, or any combination thereof; E is Co, Mn, or any combination thereof; F' is F, S, P, or any combination thereof; G is Al, Cr, Mn, Fe, Mg, La, Ce, Sr, V, or any combination thereof; Q is Ti, Mo, Mn, or any combination thereof; I' is Cr, V, Fe, Sc, Y, or any combination thereof; and J is V, Cr, Mn, Co, Ni, Cu, or any combination thereof.

The cathode active material may be, for example, $LiCoO_2$, $LiMn_xO_{2x}$ (x=1, 2), $LiNi_{1-x}Mn_xO_{x2}$ ($0<x<1$), $LiNi_{1-x-y}Co_xMn_yO_2$ ($0 \leq x \leq 0.5$ and $0 \leq y \leq 0.5$), or $LiFePO_4$. The cathode active material may be, for example, $LiCoO_2$.

The compounds listed above may have a coating layer on the surface thereof or a mixture of a compound with no coating layer and a compound having a coating layer may also be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or any mixture thereof. Any coating method, which does not adversely affect physical properties of the cathode active material (e.g., spray coating and immersing), may be used as a process of forming the coating layer. These methods are obvious to those of ordinary skill in the art, and thus detailed descriptions thereof will not be given.

The conductive material may be, but is not limited to, carbon black, graphite particulates, or the like, and any material commonly used in the art as a conductive material may also be used.

The binder may be, but is not limited to, vinylidene fluoride/hexafluoropropylene copolymer, polyvinylidene fluoride (PVDF), polyacrylonitrile, polymethylmethacrylate, polytetrafluoroethylene and any mixture thereof, a styrene butadiene rubber polymer, or the like, and any material commonly used in the art as a binder may also be used.

The solvent may be, but is not limited to, N-methylpyrrolidone, acetone, water, or the like, and any material commonly used in the art as a solvent may also be used.

Amounts of the cathode active material, the conductive material, the binder, and the solvent may be the same level as those commonly used in lithium batteries. At least one of the conductive material, the binder, and the solvent may be omitted according to the use and the configuration of the lithium battery.

Next, an anode is prepared.

For example, and anode active material composition is prepared by mixing an anode active material, a conductive material, a binder, and a solvent. The anode active material composition is directly coated on a metal current collector and dried to prepare an anode plate. Alternatively, the anode active material composition may be cast on a separate support, and then a film separated from the support is laminated on a metal current collector to prepare an anode plate.

The anode active material may be any material commonly used in the art as an anode active material of lithium batteries. For example, the anode active material may include at least one selected from lithium metal, a metal alloyable with lithium, a transition metal oxide, a non-transition metal oxide, and a carbonaceous material.

For example, the metal alloyable with lithium may be Si, Sn, Al, Ge, Pb, Bi, Sb, an Si—Y' alloy (where Y' is alkali metal, alkali earth metal, Group XIII elements, Group XIV elements, transition metal, rare earth elements, or any combination thereof, except for Si), an Sn—Y' alloy (where Y' is alkali metal, alkali earth metal, Group XIII elements, Group XIV elements, transition metal, rare earth elements, or any combination thereof, except for Sn), or the like. The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or any combination thereof.

For example, the transition metal oxide may be lithium titanium oxide, vanadium oxide, and lithium vanadium oxide.

For example, the non-transition metal oxide may be $SnO_2$, $SiO_x$ ($0<x<2$), or the like.

The carbonaceous material may be crystalline carbon, amorphous carbon, or any mixture thereof. The crystalline carbon may be graphite such as natural graphite or artificial graphite in amorphous, plate, flake, spherical, or fibrous form. The amorphous carbon may be soft carbon (carbon sintered at low temperature) or hard carbon, mesophase pitch carbides, sintered coke, and the like.

The conductive material and the binder of the anode active material composition may be the same as those of the cathode active material composition.

Amounts of the anode active material, the conductive material, the binder, and the solvent may be the same level as those commonly used in lithium batteries. At least one of the conductive material, the binder, and the solvent may be omitted according to the use and the configuration of the lithium battery.

Next, a separator to be inserted between the cathode and the anode is prepared.

The separator may be any separator commonly used in lithium batteries. Any separator having low resistance against migration of ions in the electrolyte and excellent electrolyte-retaining ability may be used. Examples of the separator may include glass fiber, polyester, Teflon, polyethylene, polypropylene, polytetrafluoro ethylene (PTFE), or any combination thereof, each of which may be a non-woven or woven fabric form. For example, a windable separator such as polyethylene and polypropylene may be used in lithium-ion batteries, and a separator having excellent organic electrolyte-retaining ability may be used in lithium-ion polymer batteries. For example, the separator may be manufactured according to the following manner.

A polymer resin, a filler, and a solvent are mixed to prepare a separator composition. The separator composition may be directly coated on an electrode and dried to form a separator. Alternatively, the separator composition may be cast on a support and then dried, and a separator film separated from the support may be laminated on the electrode to form a separator.

The polymer resin used in the manufacture of the separator is not particularly limited, and any material commonly used as a binder for electrode plates may be used. For example, a vinylidene fluoride/hexafluoropropylene copolymer, polyvinylidenefluoride (PVDF), polyacrylonitrile, polymethylmethacrylate, or any mixture thereof may be used.

Next, the above-described electrolyte is prepared.

As illustrated in FIG. 1, a lithium battery 1 includes a cathode 3, an anode 2, and a separator 4. The cathode 3, the anode 2, and the separator 4 may be wound or folded, and then accommodated in a battery case 5. Then, an electrolyte is injected into the battery case 5 and the battery case 5 is sealed with a cap assembly 6 to complete the manufacture of the lithium battery 1. The battery case may be a cylindrical type, a rectangular type, or a thin-film type. For example, the lithium battery may be a large thin-film battery. The lithium battery may be a lithium-ion battery.

Figure 2:
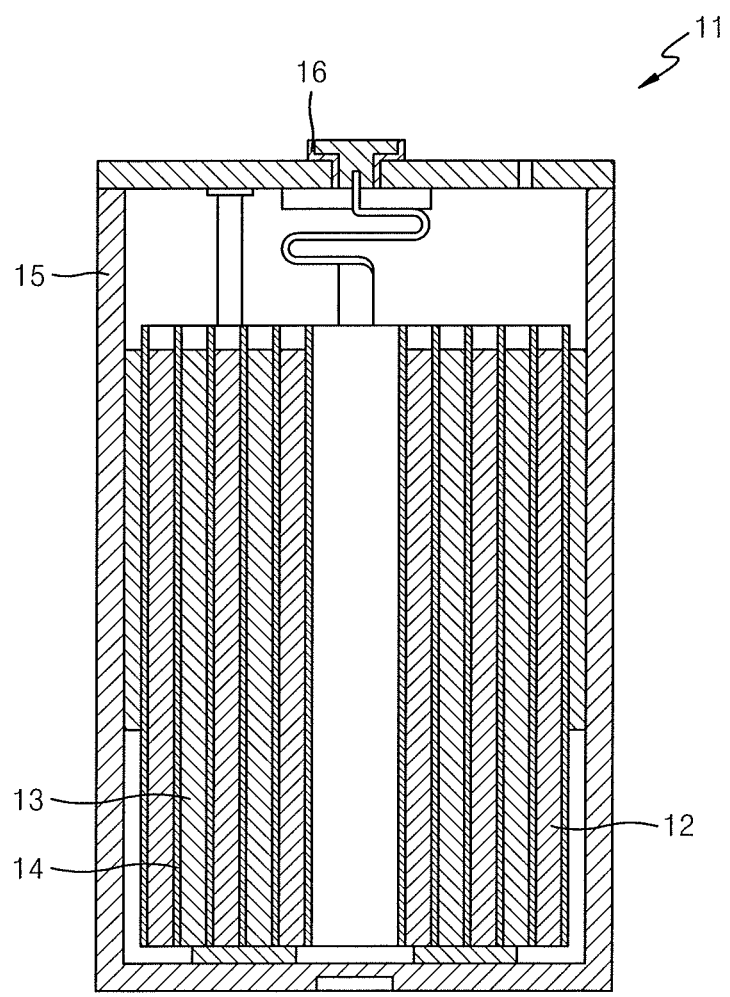
FIG. 2 is a cross-sectional view of a lithium secondary battery according to an embodiment.

For example, as illustrated in FIG. 2, a cathode 13, an anode 12, and a separator 14 are wound or folded, and then accommodated in a battery case 15 described above. Next, an electrolyte is injected into the battery case 15 and the battery case 15 is sealed with a cap assembly 16 to complete the manufacture of a lithium battery 11 in a rectangular form.

The separator may be interposed between the cathode and the anode to form a battery assembly. When the battery assembly is stacked in a bi-cell structure and impregnated with the electrolyte and the resultant is accommodated in a pouch, the manufacture of a lithium-ion polymer battery is completed.

A plurality of battery assemblies may be stacked to form a battery pack, which may be used in any device that requires high capacity and high output power, for example, in notebook computers, smart phones, and electric vehicles.

Also, due to excellent lifespan characteristics and rate properties, the lithium battery may be used in electric vehicles (EVs). For example, the lithium battery may be used in hybrid vehicles such as plug-in hybrid electric vehicles (PHEVs). The lithium battery may also be used in the field requiring a large amount of power storage such as E-bikes and electric tools.

MODE OF DISCLOSURE

Hereinafter, the present disclosure will be described in more detail according to the following examples and comparative examples. However, the following examples are merely presented to exemplify the present disclosure, and the scope of the present disclosure is not limited thereto.

EXAMPLES

Preparation of Electrolyte

Preparation Example 1: Preparation of Electrolyte

A lithium salt and a first additive were added to a mixed solvent of a first non-aqueous organic solvent and a second non-aqueous organic solvent to prepare an electrolyte.

20 vol % of ethyl butyrate (EB) was used as the first non-aqueous organic solvent, and 25 vol % of ethylene carbonate (EC), 5 vol % of propylene carbonate (PC), 20 vol % of diethyl carbonate (DEC), and 30 vol % of ethyl propionate (EP) were used as the second non-aqueous organic solvent. 1.15 M $LiPF_6$ was used as the lithium salt, and 7.0 wt % of fluoroethylene carbonate (FEC), 1.0 wt % of vinylethylene carbonate (VEC), 2.0 wt % of 1,3-propane sultone (PS), 3.0 wt % of succinonitrile (SN), and 0.2 wt % of $LiBF_4$ based on the total weight of the electrolyte were used as the first additive.

Preparation Example 2: Preparation of Electrolyte

An electrolyte was prepared in the same manner as in Preparation Example 1, except that 20 vol % of methyl valerate (MV) was used as the first non-aqueous organic solvent instead of 20 vol % of ethyl butyrate (EB).

Preparation Example 3: Preparation of Electrolyte

An electrolyte was prepared in the same manner as in Preparation Example 1, except that 20 vol % of ethylene carbonate (EC), 10 vol % of propylene carbonate (PC), and 50 vol % of diethyl carbonate (DEC) were used as the second non-aqueous organic solvent instead of 25 vol % of ethylene carbonate (EC), 5 vol % of propylene carbonate (PC), 20 vol % of diethyl carbonate (DEC), and 30 vol % of ethyl propionate (EP).

Preparation Example 4: Preparation of Electrolyte

An electrolyte was prepared in the same manner as in Preparation Example 1, except that 50 vol % of ethyl butyrate (EB) was used as the first non-aqueous organic solvent instead of 20 vol % of ethyl butyrate (EB), and 20 vol % of ethylene carbonate (EC), 10 vol % of propylene carbonate (PC), and 20 vol % of diethyl carbonate (DEC) were used as the second non-aqueous organic solvent instead of 25 vol % of ethylene carbonate (EC), 5 vol % of propylene carbonate (PC), 20 vol % of diethyl carbonate (DEC), and 30 vol % of ethyl propionate (EP).

Preparation Example 5: Preparation of Electrolyte

An electrolyte was prepared in the same manner as in Preparation Example 1, except that 7.0 wt % of fluoroethylene carbonate (FEC), 1.0 wt % of vinylethylene carbonate (VEC), and 2.0 wt % of 1,3-propane sultone (PS) based on the total weight of the electrolyte were used as the first additive instead of 7.0 wt % of fluoroethylene carbonate (FEC), 1.0 wt % of vinylethylene carbonate (VEC), 2.0 wt % of 1,3-propane sultone (PS), 3.0 wt % of succinonitrile (SN), and 0.2 wt % of $LiBF_4$ based on the total weight of the electrolyte, and 2.0 wt % of 1,3,6-hexanetricarbonitrile (1,3,6-HTCN) was further added thereto as the second additive.

Preparation Example 6: Preparation of Electrolyte

An electrolyte was prepared in the same manner as in Preparation Example 1, except that 7.0 wt % of fluoroethylene carbonate (FEC), 1.0 wt % of vinylethylene carbonate (VEC), and 2.0 wt % of 1,3-propane sultone (PS) based on the total weight of the electrolyte were used as the first additive instead of 7.0 wt % of fluoroethylene carbonate (FEC), 1.0 wt % of vinylethylene carbonate (VEC), 2.0 wt % of 1,3-propane sultone (PS), 3.0 wt % of succinonitrile (SN), and 0.2 wt % of $LiBF_4$ based on the total weight of the electrolyte.

Comparative Preparation Example 1: Preparation of Electrolyte

An electrolyte was prepared in the same manner as in Preparation Example 1, except that the first non-aqueous organic solvent was not used and 25 vol % of ethylene carbonate (EC), 5 vol % of propylene carbonate (PC), 20 vol % of ethylmethyl carbonate (EMC), 20 vol % of diethyl carbonate (DEC), and 30 vol % of ethyl propionate (EP) were used as the second non-aqueous organic solvent.

Comparative Preparation Example 2: Preparation of Electrolyte

An electrolyte was prepared in the same manner as in Preparation Example 1, except that the first non-aqueous organic solvent was not used and 25 vol % of ethylene carbonate (EC), 5 vol % of propylene carbonate (PC), 20 vol % of diethyl carbonate (DEC), 30 vol % of ethyl propionate (EP), and 20 vol % of propyl propionate (PP) were used as the second non-aqueous organic solvent.

Comparative Preparation Example 3: Preparation of Electrolyte

An electrolyte was prepared in the same manner as in Preparation Example 1, except that 60 vol % of ethyl butyrate (EB) was used as the first non-aqueous organic solvent instead of 20 vol % of ethyl butyrate (EB), and 20 vol % of ethylene carbonate (EC), 10 vol % of propylene carbonate (PC), and 10 vol % of diethyl carbonate (DEC) were used as the second non-aqueous organic solvent instead of 25 vol % of ethylene carbonate (EC), 5 vol % of propylene carbonate (PC), 20 vol % of diethyl carbonate (DEC), and 30 vol % of ethyl propionate (EP).

Compositions of the electrolytes prepared according to Preparation Examples 1 to 5 and Comparative Preparation Examples 1 to 3 are shown in Table 1 below.

Preparation of Lithium Battery

Example 1: Preparation of Lithium Battery

Preparation of Cathode 96.0 wt % of $LiCoO_2$ as a cathode active material, 2.0 wt % of Denka black as a conductive material, and 2.0 wt % of PVDF (Solef 6020, Solvay) as a binder were mixed and added to an N-methyl-2-pyrrolidone solvent, and the mixture was dispersed using a mechanical stirrer for 30 minutes to prepare a cathode active material composition. The cathode active material composition was coated on an aluminum foil current collector having a thickness of 20 μm using a doctor blade to a thickness of about 60 μm, dried in a hot-air dryer at 100° C. for 0.5 hours, further dried in a vacuum at 120° C. for 4 hours, and roll pressed to prepare a cathode having a cathode active material layer on the current collector. The prepared cathode had a mixture density of 4.22 g/cc and a loading level of 38.80 mg/cm$^2$.

Preparation of Anode 97.5 wt % of graphite (Mitsubishi Chemical Corporation) as an anode active material, 1.5 wt % of styrene-butadiene rubber (SBR) as a binder, and 1 wt % of carboxymethyl cellulose (CMC) as a thickener, were added to distilled water

TABLE 1

| | First non-aqueous organic solvent | Second non-aqueous organic solvent | First additive | Second additive | Lithium salt |
|---|---|---|---|---|---|
| Preparation Example 1 | EB 20 vol % | EC 25 vol % PC 5 vol % DEC 20 vol % EP 30 vol % | FEC 7.0 wt % VEC 1.0 wt % PS 2.0 wt % SN 3.0 wt % $LiBF_4$ 0.2 wt % | — | 1.15M $LiPF_6$ |
| Preparation Example 2 | MV 20 vol % | EC 25 vol % PC 5 vol % DEC 20 vol % EP 30 vol % | FEC 7.0 wt % VEC 1.0 wt % PS 2.0 wt % SN 3.0 wt % $LiBF_4$ 0.2 wt % | — | 1.15M $LiPF_6$ |
| Preparation Example 3 | EB 20 vol % | EC 20 vol % PC 10 vol % DEC 50 vol % | FEC 7.0 wt % VEC 1.0 wt % PS 2.0 wt % SN 3.0 wt % $LiBF_4$ 0.2 wt % | — | 1.15M $LiPF_6$ |
| Preparation Example 4 | EB 50 vol % | EC 20 vol % PC 10 vol % DEC 20 vol % | FEC 7.0 wt % VEC 1.0 wt % PS 2.0 wt % SN 3.0 wt % $LiBF_4$ 0.2 wt % | — | 1.15M $LiPF_6$ |
| Preparation Example 5 | EB 20 vol % | EC 25 vol % PC 5 vol % DEC 20 vol % EP 30 vol % | FEC 7.0 wt % VEC 1.0 wt % PS 2.0 wt % | 1,3,6-HTCN 2.0 wt % | 1.15M $LiPF_6$ |
| Preparation Example 6 | EB 20 vol % | EC 25 vol % PC 5 vol % DEC 20 vol % EP 30 vol % | FEC 7.0 wt % VEC 1.0 wt % PS 2.0 wt % | — | 1.15M $LiPF_6$ |
| Comparative Preparation Example 1 | — | EC 25 vol % PC 5 vol % EMC 20 vol % DEC 20 vol % EP 30 vol % | FEC 7.0 wt % VEC 1.0 wt % PS 2.0 wt % SN 3.0 wt % $LiBF_4$ 0.2 wt % | — | 1.15M $LiPF_6$ |
| Comparative Preparation Example 2 | — | EC 25 vol % PC 5 vol % DEC 20 vol % EP 30 vol % PP 20 vol % | FEC 7.0 wt % VEC 1.0 wt % PS 2.0 wt % SN 3.0 wt % $LiBF_4$ 0.2 wt % | — | 1.15M $LiPF_6$ |
| Comparative Preparation Example 3 | EB 60 vol % | EC 20 vol % PC 10 vol % DEC 10 vol % | FEC 7.0 wt % VEC 1.0 wt % PS 2.0 wt % SN 3.0 wt % $LiBF_4$ 0.2 wt % | — | 1.15M $LiPF_6$ | and dispersed using a mechanical stirrer for 60 minutes to prepare an anode active material composition. The anode active material composition was coated on a copper current collector having a thickness of 10 μm using a doctor blade to a thickness of about 60 μm, dried in a hot-air dryer at 100° C. for 0.5 hours, further dried in a vacuum at 120° C. for 4 hours, and roll pressed to prepare an anode having an anode active material layer on the current collector. The prepared anode had a mixture density of 1.81 g/cc and a loading level of 20.07 mg/cm$^2$.

Assembling of Lithium Battery

A pouch type (X212) lithium battery was prepared using the cathode, the anode, a polyethylene separator coated with ceramic and having a thickness of 18 μm, and the electrolyte prepared in Preparation Example 1.

Examples 2 to 6: Preparation of Lithium Battery

Pouch type (X212) lithium batteries were prepared in the same manner as in Example 1, except that the electrolytes prepared in Preparation Examples 2 to 6 were used instead of the electrolyte prepared in Preparation Example 1.

Comparative Examples 1 to 3: Preparation of Lithium Battery

Pouch type (X212) lithium batteries were prepared in the same manner as in Example 1, except that the electrolytes prepared in Comparative Preparation Examples 1 to 3 were used instead of the electrolyte prepared in Preparation Example 1.

Comparative Example 4: Preparation of Lithium Battery

A pouch type (X212) lithium battery was prepared in the same manner as in Example 1, except that a cathode having a mixture density of 3.8 g/cc was used instead of the cathode having a mixture density of 4.22 g/cc.

Evaluation of Battery Performance

Evaluation Example 1: Charge and Discharge Characteristics at Room Temperature (25° C.)

1-1. Lifespan Characteristics at Room Temperature (25° C.)

The lithium batteries prepared in Examples 1 and 2 and Comparative Examples 1 and 2 were charged with a constant current of 0.1 C rate at room temperature (25° C.) until a voltage reached 4.45 V (vs. Li), and then while maintaining the voltage of 4.45 V in a constant voltage mode, the charging process was cut off at a current of 0.1 C rate. Subsequently, the lithium batteries were discharged with a constant current of 0.1 C rate until the voltage reached 2.75 V (vs. Li) (Formation operation, 1$^{st}$ cycle).

The lithium batteries that underwent the formation operation (1$^{st}$ cycle) were charged with a constant current of 0.2 C rate at 25° C. until the voltage reached 4.45 V (vs. Li) and then, while maintaining the voltage of 4.45 V in a constant voltage mode, the charging process was cut off at a current of 0.2 C rate. Subsequently, the lithium batteries were discharged with a constant current of 0.2 C rate until the voltage reached 2.75 V (vs. Li) (formation operation, 2$^{nd}$ cycle).

The lithium batteries that underwent the formation operation were charged with a constant current of 1.0 C rate at 25° C. until the voltage reached 4.45 V (vs. Li), and then while maintaining the voltage of 4.45 V in a constant voltage mode, the charging process was cut off at a current of 0.1 C rate. Subsequently, the lithium batteries were discharged with a constant current of 1.0 C rate until the voltage reached 3.0 V (vs. Li) (1st cycle).

Subsequently, the lithium batteries were charged with a constant current of 0.2 C rate at 25° C. until the voltage reached 4.45 V (vs. Li), and then while maintaining the voltage of 4.45 V in a constant voltage mode, the charging process was cut off at a current of 0.02 C. Subsequently, the lithium batteries were discharged with a constant current of 0.2 C rate until the voltage reached 2.75 V (vs. Li). This cycle was repeated 50 times. This repetition up to the 50$^{th}$ cycle was regarded as a charging/discharging cycle, and a charging/discharging test was performed by repeating the charging/discharging cycles 14 times (total 700$^{th}$ cycle) to measure discharge capacities, respectively.

The lithium batteries were rested for 10 minutes after every charging/discharging cycle. The results of the charging/discharging test are shown in FIG. 3.

Figure 3:
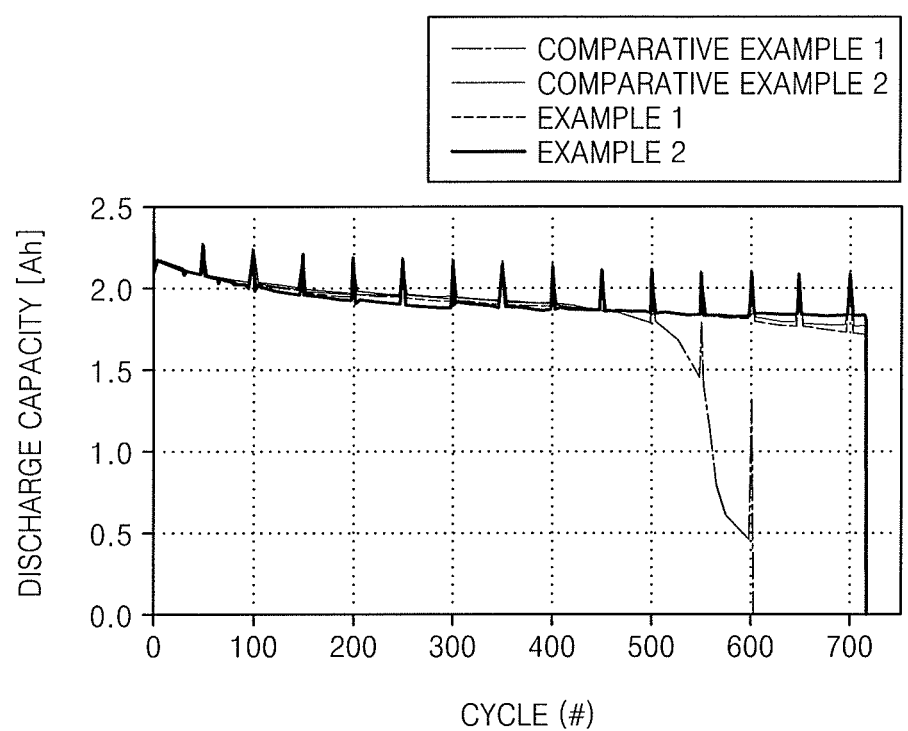
FIG. 3 is a graph illustrating discharge capacities of lithium batteries manufactured according to Examples 1 and 2 and Comparative Examples 1 and 2 with respect to the number of cycles at room temperature (25° C.).

Referring to FIG. 3, while the discharge capacities of the lithium batteries prepared according to Examples 1 and 2 were maintained at about 87 to 89% in comparison with the initial capacities until the 14$^{th}$ time (total 700$^{th}$ cycle), the discharge capacity of the lithium battery prepared according to Comparative Example 1 rapidly decreased from the 11$^{th}$ time (total 550$^{th}$ cycle). Thus, it may be confirmed that the lithium batteries prepared according to Examples 1 and 2 maintained the discharge capacities about 3 more times (total 150 cycles) than the lithium battery prepared according to Comparative Example 1, thereby having improved lifespan characteristics at room temperature (25° C.).

1-2. Cell Thickness Variation Rate at Room Temperature (25° C.)

Cell thicknesses of the lithium batteries prepared according to Examples 1 and 2 and Comparative Examples 1 and 2 were measured before the formation operation (after DF), after the formation operation (after FM), after a capacity check (1$^{st}$ cycle), after the 2$^{nd}$ time (total 100$^{th}$ cycle), after the 4$^{th}$ time (total 200$^{th}$ cycle), after the 6$^{th}$ time (total 300$^{th}$ cycle), after the 8$^{th}$ time (total 400$^{th}$ cycle), after the 10$^{th}$ time (total 500$^{th}$ cycle), after the 12$^{th}$ time (total 600$^{th}$ cycle), and after the 14$^{th}$ time (total 700$^{th}$ cycle), respectively, using a flatness measuring device (MITUTOYO, 543-490B). The results are shown in FIG. 4.

Figure 4:
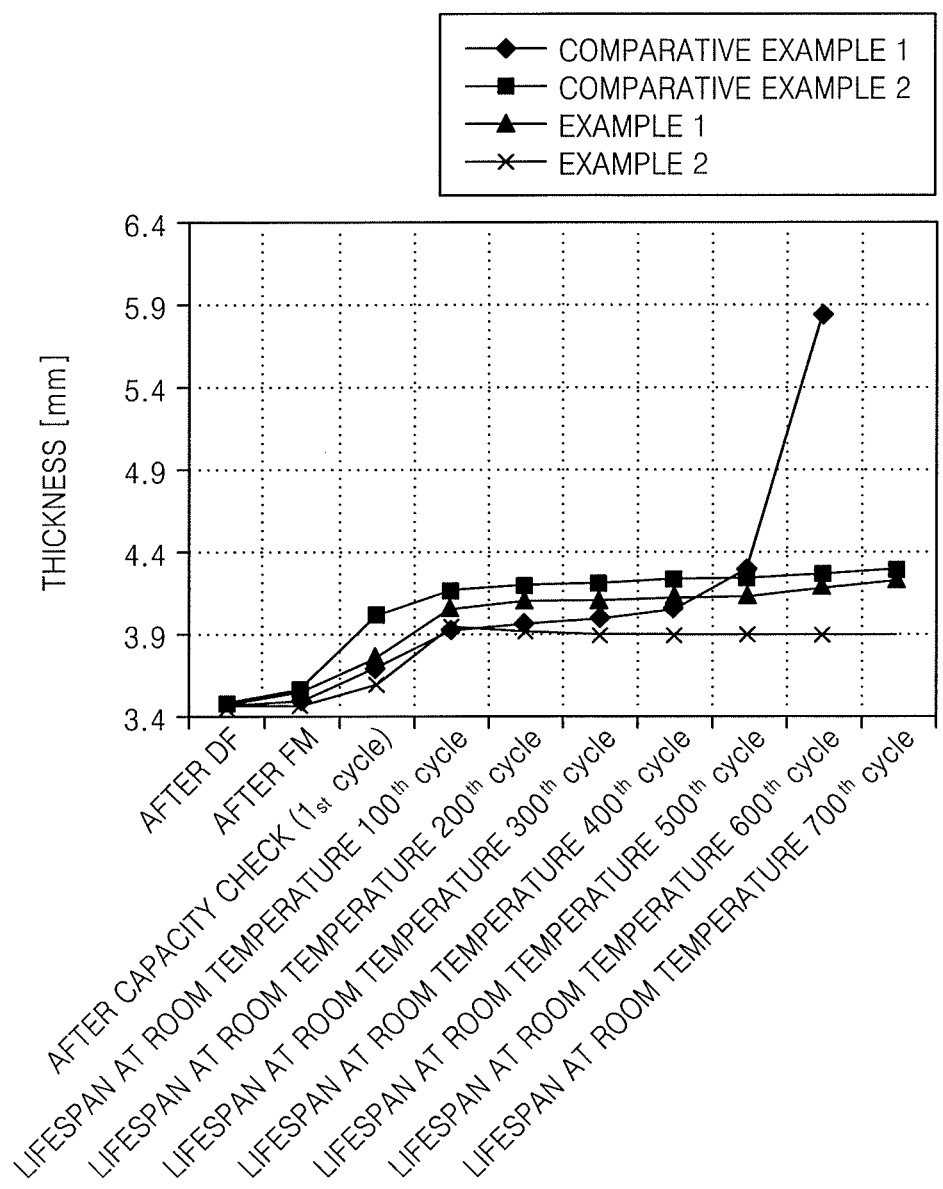
FIG. 4 is a graph illustrating thicknesses of cathodes of lithium batteries manufactured according to Examples 1 and 2 and Comparative Examples 1 and 2 from a stage before formation to a $700^{th}$ cycle at room temperature (25° C.).

Referring to FIG. 4, cell thickness variation rates of the lithium batteries prepared according to Examples 1 and 2 were about 11% until the 14$^{th}$ time (total 700$^{th}$ cycle). In comparison, the cells thickness variation rate of the lithium battery prepared according to Comparative Example 1 was about 41% until the 13$^{th}$ time (total 650$^{th}$ cycle). Therefore, it may be confirmed that the lithium batteries prepared according to Examples 1 and 2 had less cell thickness variation than the lithium battery prepared according to Comparative Example 1 at room temperature (25° C.).

Evaluation Example 2: Charging/Discharging Characteristics at High Temperature (45° C.)

2-1. Lifespan Characteristics at High Temperature (45° C.)

Charging/discharging characteristics of the lithium batteries prepared according to Examples 1 to 6 and Comparative Examples 1 to 4 were evaluated in the same manner as in Evaluation Example 1, except that charging and discharging temperature was changed to 45° C. The results of the charging/discharging test are shown in FIGS. 5 and 7 to 9.

Figure 5:
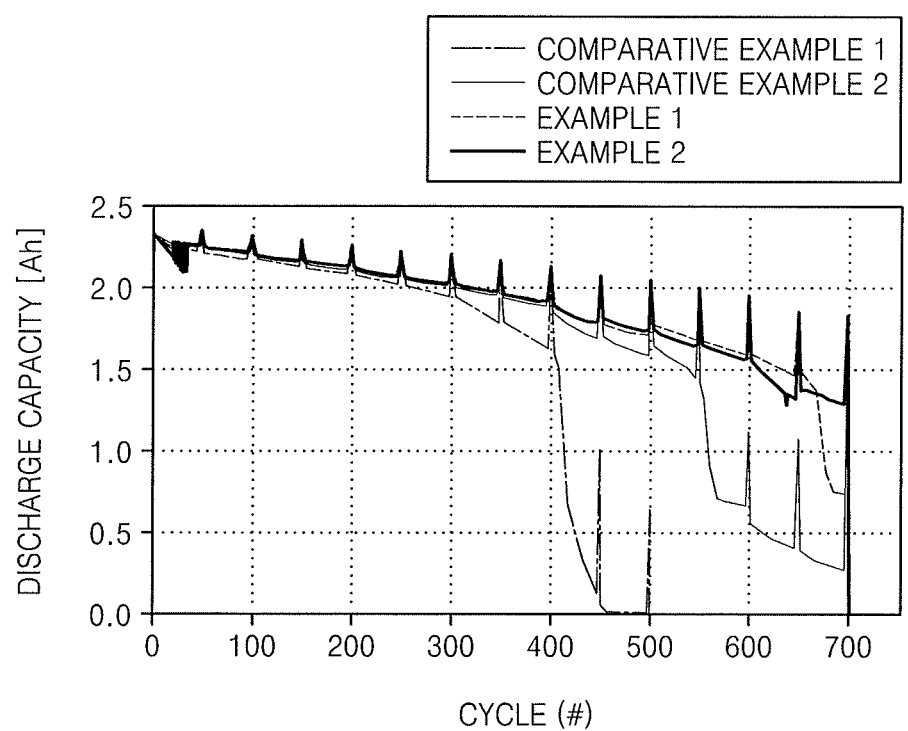
FIG. 5 is a graph illustrating discharge capacities of lithium batteries manufactured according to Examples 1 and 2 and Comparative Examples 1 and 2 with respect to the number of cycles at a high temperature (45° C.).

Referring to FIG. 5, while the discharge capacities of the lithium batteries prepared according to Examples 1 and 2 were maintained at about 57% and about 32%, respectively, in comparison with the initial capacities until the $14^{th}$ time (total $700^{th}$ cycle), the discharge capacities of the lithium batteries prepared according to Comparative Examples 1 and 2 rapidly decreased from the $8^{th}$ time (total $400^{th}$ cycle) and the $11^{th}$ time (total $550^{th}$ cycle), respectively. Thus, it may be confirmed that the lithium batteries prepared according to Examples 1 and 2 maintained the discharge capacities about 6 more times (total 300 cycle) and about 3 more times (total 150 cycles), respectively, than the lithium batteries prepared according to Comparative Examples 1 and 2, thereby having improved lifespan characteristics at a high temperature (45° C.).

Figure 7:
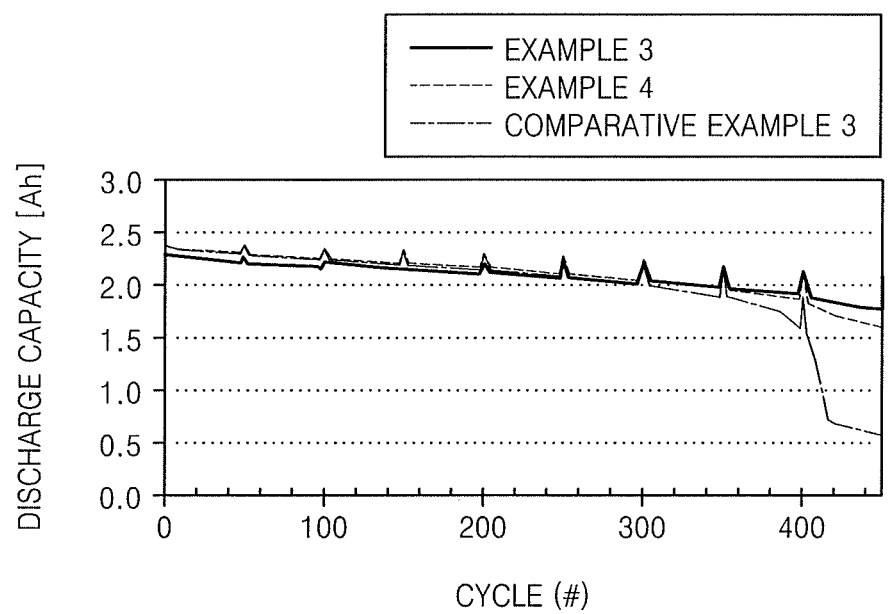
FIG. 7 is a graph illustrating discharge capacities of lithium batteries manufactured according to Examples 3 and 4 and Comparative Example 3 with respect to the number of cycles at a high temperature (45° C.).

Referring to FIG. 7, while the discharge capacities of the lithium batteries prepared according to Examples 3 and 4 were maintained at about 89% and about 81%, respectively, in comparison with the initial capacities until the $9^{th}$ time (total $450^{th}$ cycle), the discharge capacity of the lithium battery prepared according to Comparative Example 3 rapidly decreased from the $8^{th}$ time (total $400^{th}$ cycle). Thus, it may be confirmed that the lithium batteries prepared according to Examples 3 and 4 (where the electrolytes include 20 vol % of EB and EB 50 vol % as the first non-aqueous organic solvent) maintained the discharge capacities about 1 more time (total 50 cycle) than the lithium battery prepared according to Comparative Example 3 (where the electrolyte includes 60 vol % of EB as the first non-aqueous organic solvent), thereby having improved lifespan characteristics at a high temperature (45° C.).

Figure 8:
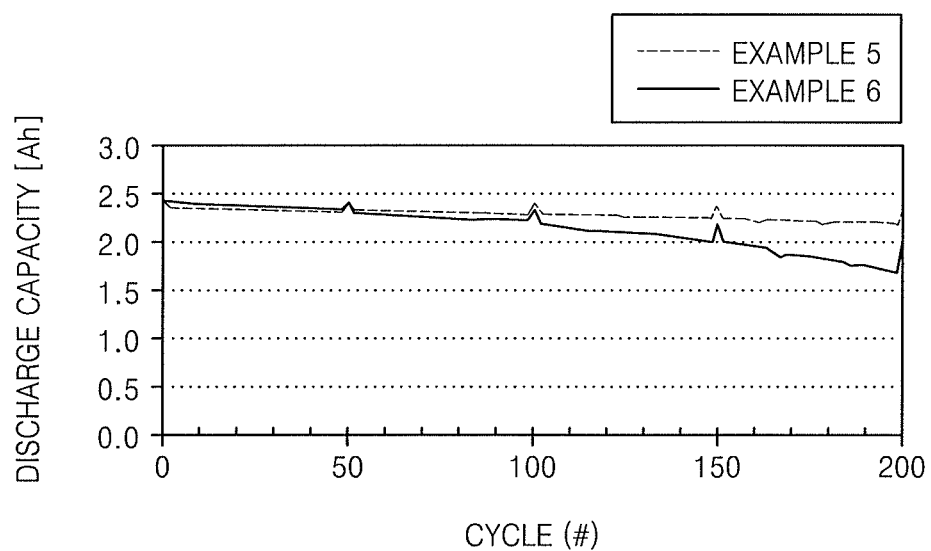
FIG. 8 is a graph illustrating discharge capacities of lithium batteries manufactured according to Examples 5 and 6 with respect to the number of cycles at a high temperature (45° C.).

Referring to FIG. 8, while the discharge capacity of the lithium battery prepared according to Example 5 was maintained at about 96.6% in comparison with the initial capacity until the $4^{th}$ time (total $200^{th}$ cycle), the discharge capacity of the lithium battery prepared according to Example 6 decreased to about 81.5% from the initial capacity. Thus, it may be confirmed that the lithium battery prepared according to Example 5 (where the electrolytes include 1,3,6-HTCN as the second additive) had a higher discharge capacity retention rate than the lithium battery prepared according to Example 6 (where the electrolyte does not include the second additive), thereby having improved lifespan characteristics at a high temperature (45° C.).

Figure 9:
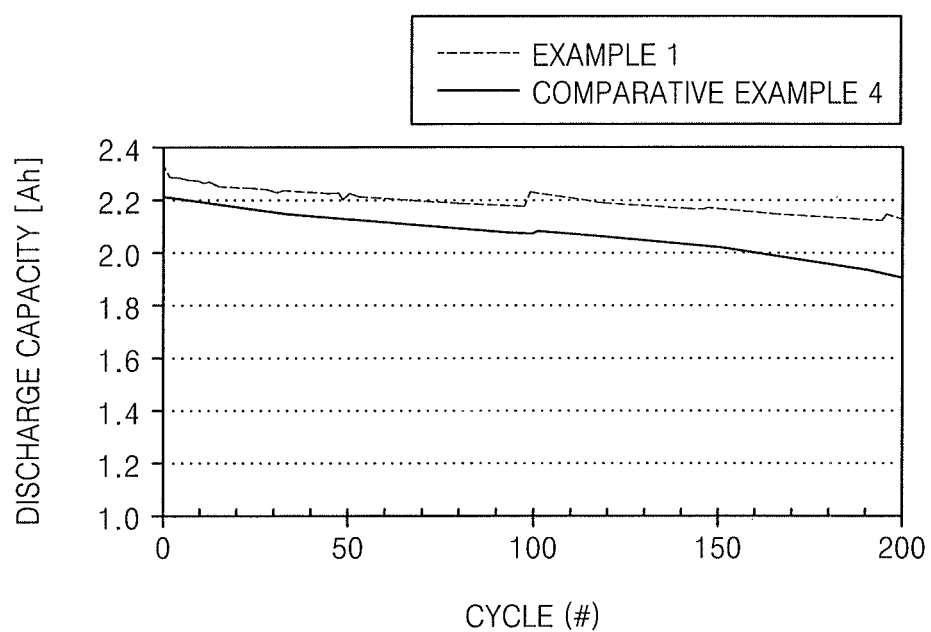
FIG. 9 is a graph illustrating discharge capacities of lithium batteries manufactured according to Example 1 and Comparative Example 4 with respect to the number of cycles at a high temperature (45° C.).

Referring to FIG. 9, while the discharge capacity of the lithium battery prepared according to Example 1 was maintained at about 91.8% in comparison with the initial capacity until the $4^{th}$ time (total $200^{th}$ cycle), the discharge capacity of the lithium battery prepared according to Comparative Example 4 decreased to about 86.3% from the initial capacity. Thus, it may be confirmed that the lithium battery prepared according to Example 1 (having a cathode mixture density of 4.22 g/cc) had a higher discharge capacity retention rate than the lithium battery prepared according to Comparative Example 4 (having a cathode mixture density of 3.8 g/cc), thereby having improved lifespan characteristics at a high temperature (45° C.).

2-2. Cell Thickness Variation Rate at High Temperature (45° C.)

Cell thicknesses of the lithium batteries prepared according to Examples 1 and 2 and Comparative Examples 1 and 2 were measured before the formation operation (after DF), after the formation operation (after FM), after a capacity check ($1^{st}$ cycle), after the $2^{nd}$ time (total $100^{th}$ cycle), after the $4^{th}$ time (total $200^{th}$ cycle), after the $6^{th}$ time (total $300^{th}$ cycle), after the $8^{th}$ time (total $400^{th}$ cycle), after the $10^{th}$ time (total $500^{th}$ cycle), after the $12^{th}$ time (total $600^{th}$ cycle), and after the $14^{th}$ time (total $700^{th}$ cycle), respectively, using a flatness measuring device (MITUTOYO, 543-490B). The results are shown in FIG. 6.

Figure 6:
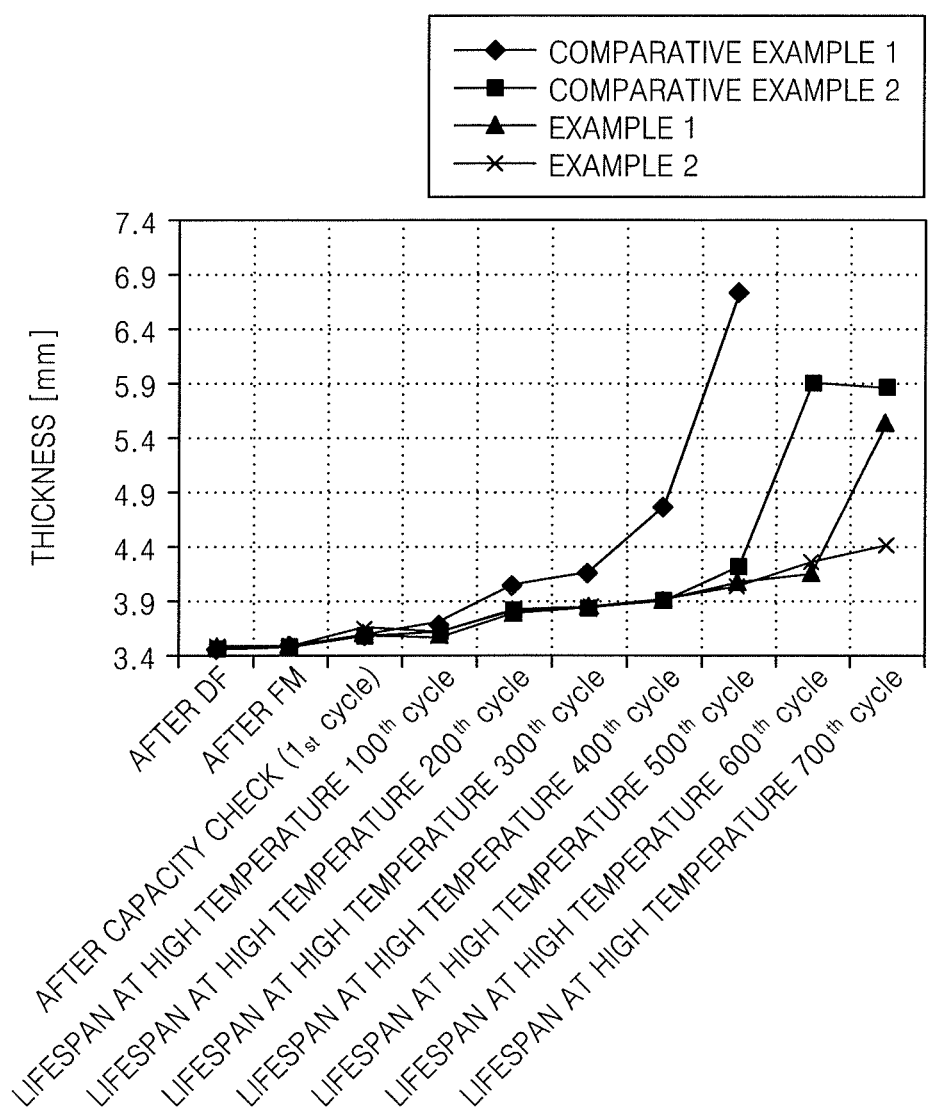
FIG. 6 is a graph illustrating thicknesses of cathodes of lithium batteries manufactured according to Examples 1 and 2 and Comparative Examples 1 and 2 from a stage before formation to a $700^{th}$ cycle at a high temperature (45° C.).

Referring to FIG. 6, cell thickness variation rates of the lithium batteries prepared according to Examples 1 and 2 were about 21% until the $14^{th}$ time (total $700^{th}$ cycle). In comparison, the cells thickness variation rates of the lithium batteries prepared according to Comparative Examples 1 and 2 were about 50% until the $11^{th}$ time (total $550^{th}$ cycle) and the $14^{th}$ time (total $700^{th}$ cycle). Therefore, it may be confirmed that the lithium batteries prepared according to Examples 1 and 2 had less cell thickness variation than the lithium batteries prepared according to Comparative Examples 1 and 2 at a high temperature (45° C.).

Evaluation Example 3: Measurement of Cell Thickness Variation Rate after Maintaining at High Temperature (60° C.)

The lithium batteries prepared according to Examples 1 and 2 and Comparative Examples 1 and 2 were charged and discharged twice for formation according to Evaluation Example 1.1, and $1^{st}$ cycle of charging/discharging was performed after the charging/discharging for formation. Subsequently, the lithium batteries were maintained in a constant temperature chamber at 60° C. for 21 days, and then cell thicknesses were measured, respectively, using a flatness measuring device (MITUTOYO, 543-490B). The results are shown in FIG. 10.

Figure 10:
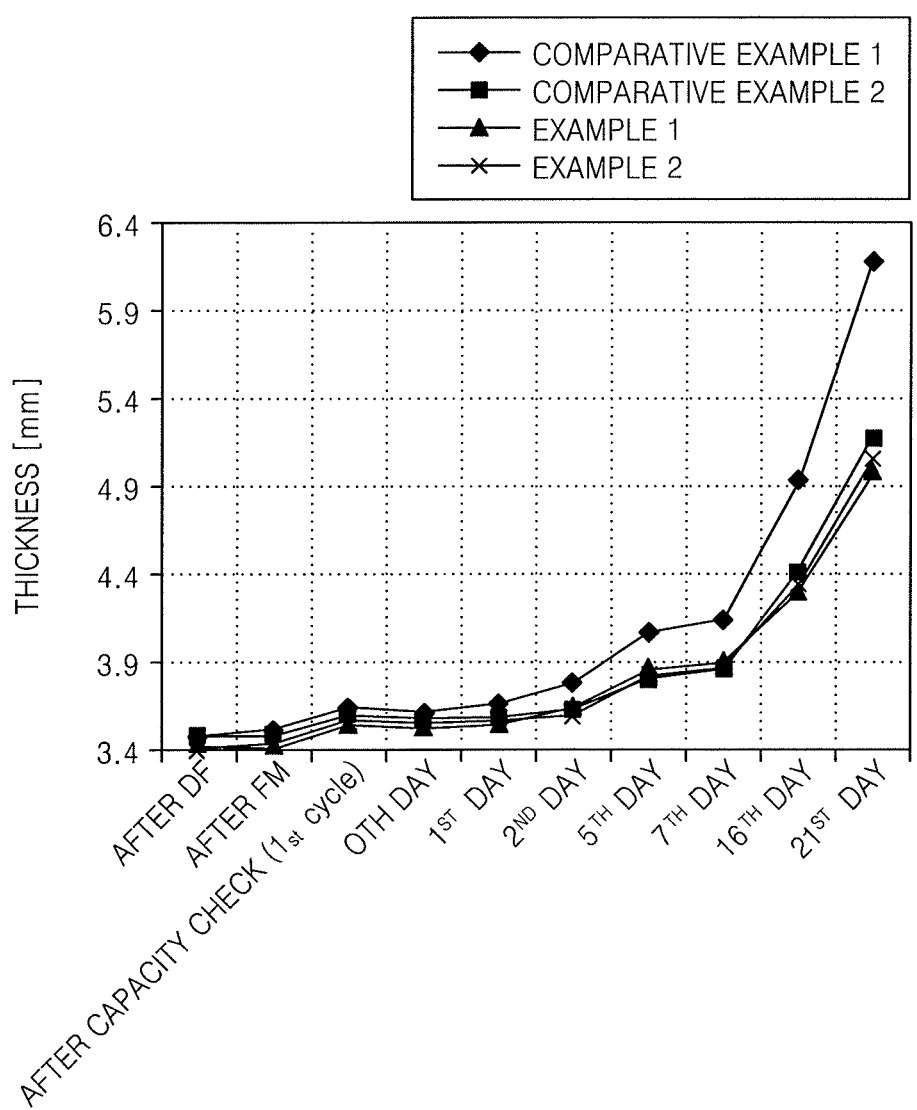
FIG. 10 is a graph illustrating thicknesses of cathodes of lithium batteries manufactured according to Examples 1 and 2 and Comparative Examples 1 and 2 after being maintained in a constant temperature chamber at 60° C. for 21 days.

Referring to FIG. 10, the cell thickness variation rates of the lithium batteries prepared according to Examples 1 and 2 were about 32% after the lithium batteries were maintained in a constant temperature chamber at 60° C. for 21 days. In comparison, the cell thickness variation rates of the lithium batteries prepared according to Comparative Examples 1 and 2 were about 43.7%, respectively, after the lithium batteries were maintained in a constant temperature chamber at 60° C. for 21 days. Therefore, it may be confirmed that the lithium batteries prepared according to Examples 1 and 2 had less cell thickness variation than the lithium batteries prepared according to Comparative Examples 1 and 2 after being maintained in a constant temperature chamber at 60° C. for 21 days.

The invention claimed is:

1. A lithium battery comprising:
a cathode having a mixture density of 3.9 g/cc or greater;
an anode; and
an electrolyte disposed between the cathode and the anode and comprising a non-aqueous organic solvent,
wherein:
the lithium battery has an operating voltage of 4.4 V or greater,
the non-aqueous organic solvent includes:
a first non-aqueous organic solvent that includes ethyl butyrate or methyl valerate, and
a second non-aqueous organic solvent that includes ethylene carbonate, and
an amount of the first non-aqueous organic solvent is from 20 to 50 vol % based on a total volume of the non-aqueous organic solvent.

2. The lithium battery of claim 1, wherein the cathode has a mixture density of 3.9 to 4.3 g/cc.

3. The lithium battery of claim 1, wherein the lithium battery has an operating voltage of 4.4 to 4.5 V.

4. The lithium battery of claim 1, wherein the second non-aqueous organic solvent further includes propylene carbonate, diethyl carbonate, or ethyl propionate.

5. The lithium battery of claim 4, wherein an amount of the ethylene carbonate is from 20 to 30 vol % based on the total volume of the non-aqueous organic solvent.

6. The lithium battery of claim 4, wherein:
the second non-aqueous organic solvent further includes the propylene carbonate, and
an amount of the propylene carbonate is greater than 0 vol % to 10 vol % based on the total volume of the non-aqueous organic solvent.

7. The lithium battery of claim 4, wherein:
the second non-aqueous organic solvent further includes the ethyl propionate, and
an amount of the ethyl propionate is from 20 to 50 vol % based on the total volume of the non-aqueous organic solvent.

8. The lithium battery of claim 1, wherein the electrolyte further comprises at least one first additive selected from fluoroethylene carbonate, vinylethylene carbonate, 1,3-propane sultone, succinonitrile, and $LiBF_4$.

9. The lithium battery of claim 8, wherein an amount of the at least one first additive is from 0.5 to 20 wt % based on a total weight of the electrolyte.

10. The lithium battery of claim 1, wherein the electrolyte further comprises a second additive represented by Formula 1 below:

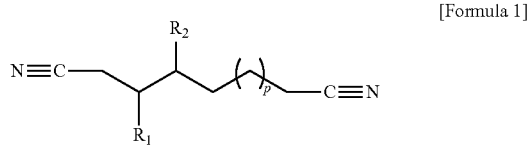

[Formula 1]

wherein, in Formula 1,
p is an integer from 0 to 10; and
$R_1$ and $R_2$ are each independently a hydrogen atom, a cyano group, a substituted or unsubstituted C1-C5 alkylene cyano group, or a combination thereof,
wherein at least one of $R_1$ and $R_2$ is a cyano group or a substituted or unsubstituted C1-C5 alkylene cyano group.

11. The lithium battery of claim 10, wherein the second additive comprises 1,3,6-hexanetricarbonitrile, 1,2,6-hexanetricarbonitrile, or a combination thereof.

12. The lithium battery of claim 10, wherein an amount of the second additive is from 0.5 to 5 wt % based on the total weight of the electrolyte.

13. The lithium battery of claim 10, wherein the cathode has a film formed on a surface thereof, as a product derived from the first additive, the second additive, or a part or all of the first additive and the second additive.

14. The lithium battery of claim 1, wherein the electrolyte further comprises at least one lithium salt selected from LiCl, LiBr, LiI, $LiClO_4$, $LiBF_4$, $LiBioCl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, and lithium chloroborate.

15. The lithium battery of claim 1, wherein the electrolyte comprises:
the first non-aqueous organic solvent;
the second non-aqueous organic solvent, the second non-aqueous organic solvent further including propylene carbonate and ethyl propionate;
a first additive comprising fluoroethylene carbonate, vinylethylene carbonate, 1,3-sultone, succinonitrile, and $LiBF_4$; and
a lithium salt.

16. The lithium battery of claim 15, wherein a weight ratio of fluoroethylene carbonate, vinylethylene carbonate, 1,3-propane sultone, succinonitrile, and $LiBF_4$ comprised in the first additive is 4.0 to 10.0:0.1 to 5.0:0.1 to 5.0:0.1 to 7.0:0.01 to 1.0.

17. The lithium battery of claim 1, wherein the electrolyte comprises:
the first non-aqueous organic solvent;
the second non-aqueous organic solvent, the second non-aqueous organic solvent further including propylene carbonate and ethyl propionate;
a first additive comprising fluoroethylene carbonate, vinylethylene carbonate, and 1,3-propane sultone; and
a second additive comprising 1,3,6-hexanetricarbonitrile or 1,2,6-hexanetricarbonitrile; and
a lithium salt.

18. The lithium battery of claim 17, wherein a weight ratio of fluoroethylene carbonate, vinylethylene carbonate, and 1,3-propane sultone comprised in the first additive is 4.0 to 10.0:0.1 to 5.0:0.1 to 5.0.

19. The lithium battery of claim 17, wherein an amount of the second additive is from 0.5 to 2 wt % based on the total weight of the electrolyte.

20. A lithium battery comprising:
a cathode having a mixture density of 3.9 glee or greater;
an anode; and
an electrolyte between the cathode and the anode and including a non-aqueous organic solvent,
wherein:
the lithium battery has an operating voltage of 4.4 V or greater,
the non-aqueous organic solvent includes a first non-aqueous organic solvent, the first non-aqueous organic solvent including methyl valerate, and
an amount of the first non-aqueous organic solvent is from 20 to 50 vol %, based on a total volume of the non-aqueous organic solvent.

* * * * *